(12) United States Patent
Zhou et al.

(10) Patent No.: US 11,137,888 B2
(45) Date of Patent: Oct. 5, 2021

(54) DEVICE, PROGRAM, AND METHOD FOR CREATING MONITORING IMAGE

(71) Applicant: CONTEC CO., LTD., Osaka (JP)

(72) Inventors: Jianping Zhou, Osaka (JP); Shinichi Aramaki, Osaka (JP)

(73) Assignee: CONTEC CO., LTD., Osaka (JP)

( * ) Notice: Subject to any disclaimer, the term of this patent is extended or adjusted under 35 U.S.C. 154(b) by 172 days.

(21) Appl. No.: 15/761,945

(22) PCT Filed: Jan. 7, 2016

(86) PCT No.: PCT/JP2016/050298
§ 371 (c)(1),
(2) Date: Mar. 21, 2018

(87) PCT Pub. No.: WO2017/051544
PCT Pub. Date: Mar. 30, 2017

(65) Prior Publication Data
US 2018/0275858 A1 Sep. 27, 2018

(30) Foreign Application Priority Data
Sep. 25, 2015 (JP) .............................. JP2015-187544

(51) Int. Cl.
*G06F 3/0484* (2013.01)
*G06F 3/14* (2006.01)
(Continued)

(52) U.S. Cl.
CPC ......... *G06F 3/04845* (2013.01); *G05B 19/05* (2013.01); *G05B 19/41875* (2013.01);
(Continued)

(58) Field of Classification Search
CPC ........ G05B 2219/23258; G05B 19/056; G05B 2219/13144; G05B 2219/23067;
(Continued)

(56) References Cited

U.S. PATENT DOCUMENTS 5,623,681 A    4/1997  Rivette et al.
5,812,394 A *  9/1998  Lewis ................ G05B 19/0426
                                                          700/17
(Continued)

FOREIGN PATENT DOCUMENTS

CN    1141093 A    1/1997
CN    1580999 A    2/2005
(Continued)

OTHER PUBLICATIONS

Invensys, "Wonderware in Touch HMI Getting Started Guide", published: Aug. 26, 2014, pp. 1-68 (Year: 2014).*
(Continued)

*Primary Examiner* — Wilson W Tsui
(74) *Attorney, Agent, or Firm* — Kusner & Jaffe

(57) ABSTRACT

A device for creating the monitoring image executes display data for each display component. The display component includes an edition region and an operation check region. An operation can be checked using the operation check region while the monitoring image is created using the edition region. A monitoring image without switching devices is efficiently created.

8 Claims, 6 Drawing Sheets

(51) Int. Cl.
- *G05B 19/05* (2006.01)
- *G06F 3/0481* (2013.01)
- *G05B 23/02* (2006.01)
- *G05B 19/418* (2006.01)
- *G06F 3/0482* (2013.01)
- *H04L 29/08* (2006.01)

(52) U.S. Cl.
CPC ........... *G05B 23/02* (2013.01); *G06F 3/0481* (2013.01); *G06F 3/0482* (2013.01); *G06F 3/14* (2013.01); *H04L 67/12* (2013.01); *G05B 2219/32404* (2013.01); *G06F 3/04842* (2013.01)

(58) Field of Classification Search
CPC ........... G05B 2219/25067; G05B 2219/24215; G05B 2219/31467; G05B 2219/32128; G05B 19/05; G05B 19/41875; G05B 23/02; G05B 3/0481; G05B 2219/32404; G06F 8/34; G06F 16/25; G06F 3/04845; G06F 3/0481; G06F 3/0482; G06F 3/04842; G06F 3/14; H04L 7/12
See application file for complete search history.

(56) References Cited

U.S. PATENT DOCUMENTS

| | | | |
|---|---|---|---|
| 7,725,528 B1* | 5/2010 | Zink | G05B 19/054 709/203 |
| 8,321,806 B2 | 11/2012 | Agrusa et al. | |
| 8,717,374 B2 | 5/2014 | Nixon | |
| 2002/0124011 A1* | 9/2002 | Baxter | G05B 19/418 |
| 2003/0033037 A1* | 2/2003 | Yuen | G05B 19/0426 700/86 |
| 2005/0114535 A1 | 5/2005 | Nobuhiro, II et al. | |
| 2007/0165031 A1 | 7/2007 | Gilbert et al. | |
| 2008/0189536 A1* | 8/2008 | Mann | G06F 15/177 713/1 |
| 2008/0189638 A1* | 8/2008 | Mody | G05B 19/0426 715/771 |
| 2009/0217200 A1* | 8/2009 | Hammack | G05B 19/0426 715/810 |
| 2010/0014585 A1 | 6/2010 | Duchene et al. | |
| 2010/0275139 A1 | 10/2010 | Hammack et al. | |
| 2010/0292809 A1 | 11/2010 | Kobayashi et al. | |
| 2012/0041570 A1 | 2/2012 | Jones et al. | |
| 2012/0062577 A1 | 3/2012 | Nixon | |
| 2012/0198547 A1 | 8/2012 | Fredette et al. | |
| 2012/0251996 A1 | 10/2012 | Jung et al. | |
| 2013/0275893 A1 | 10/2013 | Kawamura et al. | |
| 2014/0303755 A1 | 10/2014 | Landgraf et al. | |
| 2015/0160816 A1 | 6/2015 | Furihata | |
| 2016/0179359 A1* | 6/2016 | Kodejs | G06F 3/04817 715/763 |

FOREIGN PATENT DOCUMENTS

| | | |
|---|---|---|
| CN | 100394338 C | 6/2008 |
| CN | 101458526 A | 6/2009 |
| CN | 101750974 A | 6/2010 |
| CN | 101872280 A | 10/2010 |
| CN | 102053571 A | 5/2011 |
| CN | 102227692 A | 10/2011 |
| CN | 102402214 A | 4/2012 |
| CN | 102819425 A | 12/2012 |
| CN | 103282879 A | 9/2013 |
| CN | 103713565 A | 4/2014 |
| CN | 104597861 A | 5/2015 |
| CN | 104699036 A | 6/2015 |
| EP | 2 246 759 A2 | 11/2010 |
| EP | 2869149 A1 | 5/2015 |
| JP | 2001282326 A | 10/2001 |
| JP | 2006134099 A | 5/2006 |
| JP | 2007193425 A | 8/2007 |
| JP | 2009-199477 A | 9/2009 |
| JP | 2010128735 A | 6/2010 |
| TW | I474141 | 2/2015 |
| WO | WO 2005/109130 A1 | 11/2005 |
| WO | WO 2009/046095 A1 | 4/2009 |
| WO | WO-2012/086049 A1 | 6/2012 |

OTHER PUBLICATIONS

International Search Report from corresponding International Patent Application No. PCT/JP2016/050298, dated Mar. 29, 2016.
Taiwanese Office Action with English machine translation, dated Apr. 2, 2019.
Extended European Search Report issued in corresponding European Patent Application No. 16848335.2 dated Aug. 23, 2018.
Office Action issued in connection with corresponding Chinese Patent Application No. 201680054770.1, dated Dec. 30, 2019.

* cited by examiner

DEVICE, PROGRAM, AND METHOD FOR CREATING MONITORING IMAGE

TECHNICAL FIELD

The present invention relates to a device, a program, and a method for creating a monitoring image used during remote monitoring and remote control of an operating facility, e.g., a factory.

BACKGROUND ART

In the case of an operating facility, e.g., a factory, a status of the operating facility may be monitored and an operating status of the operating facility may be controlled remotely from the operating facility. Remote monitoring and remote control may be performed using an image displayed on the monitor of the controller of a PC and so on. Such an image illustrates, for example, components including switches and various devices in a factory. A temperature, a quantity, and a weight to be monitored are displayed as numeric values or on a meter, allowing an operator to intuitively recognize the statuses of the factory and components, thereby improving operability. Such an image is referred to as a monitoring image.

In the creation of a monitoring image according to the related art, a designer first places display components indicating a lamp, a switch, a device, and a meter and the like on the operation display of a device for creating a monitoring image. The display components may be previously created display components or display components created during development. The placed display components are then linked to the respective components of an operating facility, for example, the switches and devices of the operating facility. Linking means matching of numeric values and statuses between the display components and the respective components. Moreover, in the case of matching of statuses of the display components and the respective components, scripts for operating the components are associated with the display components. In this way, a link and a script are provided for each of the display components, thereby forming display data for each of the display components. According to the display data, for example, when a switch of an operating facility is turned off, the corresponding display component is turned off in a monitoring image, whereas when a display component is turned on in the monitoring image, the corresponding switch of the operating facility is turned on. If the temperature of a component of the operating facility reaches 180° C., the corresponding display component in the monitoring image indicates 180° C.

CITATION LIST

Patent Literature

Patent Literature 1: Japanese Patent Laid-Open No. 2006-134099

SUMMARY OF INVENTION

Technical Problem

In a device and method for creating a monitoring image according to the related art, however, the components of the operating facility cannot be operated or the operation of the monitoring image for monitoring a status of the component cannot be checked during the creation of the monitoring image. Thus, before an operation check, display data completed in the device for creating the monitoring image needs to be transferred to a device for checking the operation of the monitoring image or software for an operation check. For this reason, an operation can be checked only after a monitoring image is created to a certain degree. Defects in operations cannot be checked and corrected at any time, precluding efficient creation of a monitoring image.

In order to solve the problem, an object of the present invention is to efficiently create a monitoring image.

Solution to Problem

In order to attain the object, a monitoring-image creating device according to an embodiment of the present invention is a device for creating a monitoring image, the device including: a monitor that displays an edition screen for editing the monitoring image; and an arithmetic unit that controls the edition screen, wherein the edition screen includes a display-component selection screen, an operation screen, and a property screen, the display-component selection screen includes a display component constituting the monitoring image, the display component is selected and the monitoring image is placed in the operation screen, link information between the display component and an external facility is written in the property screen, the arithmetic unit sets a link according to the link information and optionally creates a script for operating the display component, the display component includes an edition region and an operation check region, and the edition region is selected so as to edit the monitoring image, whereas the operation check region is selected and executed so as to check an operation of the display component on the operation screen.

A monitoring-image creating device according to an embodiment of the present invention is a device for creating a monitoring image, the device including: a monitor that displays an edition screen for editing the monitoring image; and an arithmetic unit that controls the edition screen, wherein the edition screen includes a display-component selection screen, an operation screen, and a property screen, the display-component selection screen includes a display component constituting the monitoring image, the display component is selected and the monitoring image is placed in the operation screen, link information between the display component and an external facility is written in the property screen, the arithmetic unit sets a link according to the link information and optionally creates a script for operating the display component, the display component includes an edition region and an operation check region, and an edition mode and an operation check mode are switchable on the same edition screen such that selection of the edition mode edits the monitoring image using the edition region and selection of the operation check mode executes the operation check region so as to check an operation of the display component on the operation screen.

A method for creating a monitoring image according to an embodiment of the present invention is a method for creating a monitoring image of an operating facility for each display component by using the device for creating the monitoring image, the display component including an edition region and an operation check region, wherein the device for creating the monitoring image is configured such that selection of the edition region edits the monitoring image, whereas selection and execution of the operation check region enable an operation check on the display component on the device for creating the monitoring image, the method including: selecting the edition region of the display component and placing the display component; setting a link between the display component and an external facility while selecting the edition region; and selecting the operation check region and checking an operation of the display component.

A program for creating a monitoring image according to an embodiment of the present invention is a program for creating a monitoring image for each display component by using a monitor for displaying an edition screen and a computer, the program causing the computer to display an edition region and an operation check region as the display component on the edition screen, place the display component while selecting the edition region of the display component, set a link between the display component and an external facility while selecting the edition region of the display component, and select the operation check region of the display component and check an operation of the display component.

A program for creating a monitoring image according to an embodiment of the present invention is a program for creating a monitoring image for each display component by using a monitor for displaying an edition screen and a computer, the program causing the computer to switch an edition mode and an operation check mode on the same edition screen in response to an input from outside, display an edition region as the display component on the edition screen in the edition mode and display an operation check region as the display component on the edition screen in the operation check mode, place the display component while displaying the edition region of the display component, set a link between the display component and an external facility while displaying the edition region of the display component, and check an operation of the display component while displaying the operation check region of the display component.

Advantageous Effect of Invention

As has been discussed, display data can be executed, and the display component includes the edition region and the operation check region. Thus, an operation can be checked using the operation check region while the monitoring image is created using the edition region. This allows the monitoring image to be efficiently created without switching devices.

DETAILED DESCRIPTION OF THE INVENTION

Figure 1:
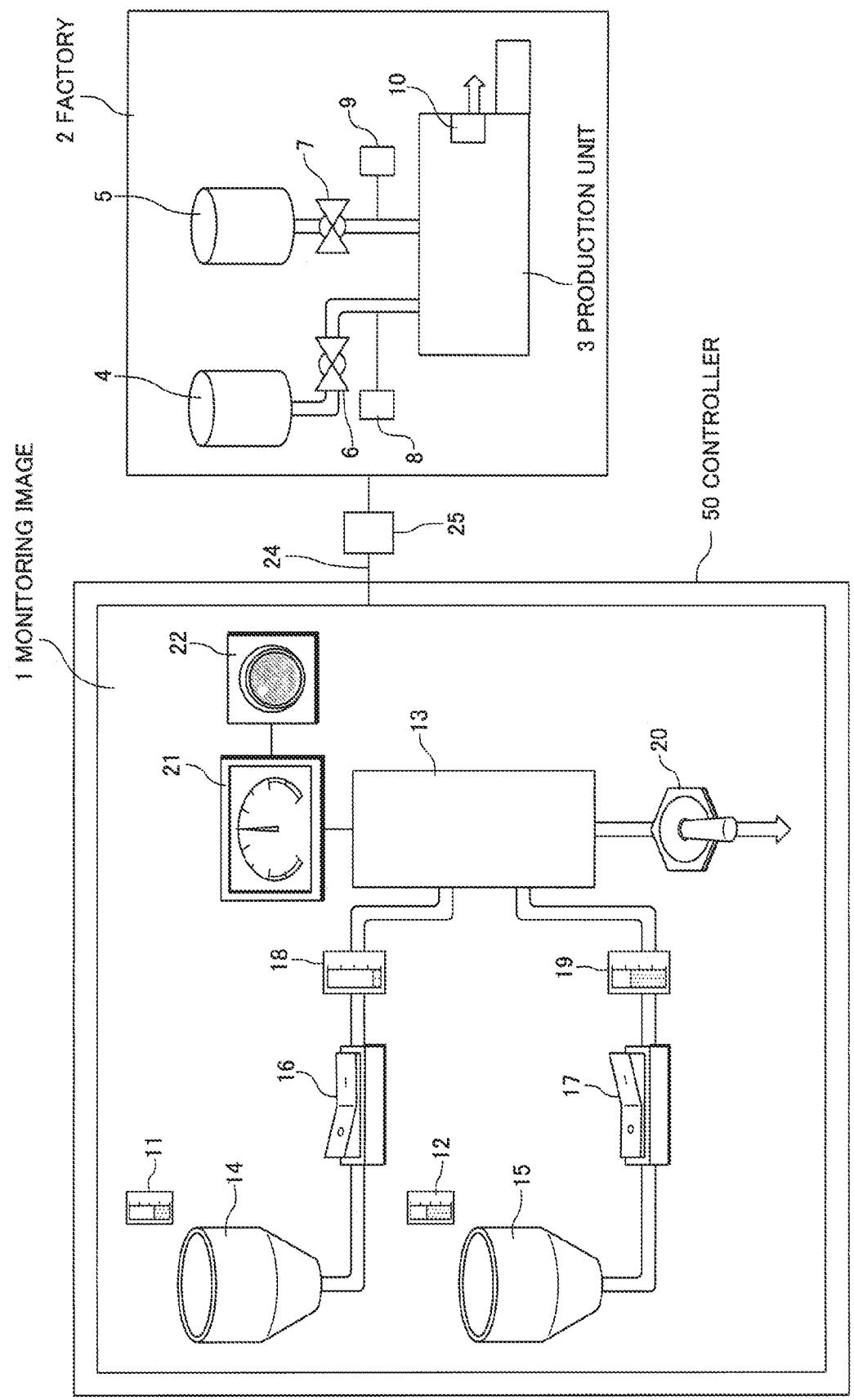
FIG. 1 illustrates the configuration of an operating facility and a monitoring image.

An operating facility is equivalent to various facilities such as a factory, an experiment/research facility, agricultural equipment including an agricultural sprinkler, and a medical facility. In an operating facility, various appliances or devices (Hereinafter, will be collectively called components) are operated. For example, the operations include monitoring of infrastructures for water supply and gas, air conditioning, and energy consumption, and SCADA (Supervisory Control And Data Acquisition) for a control facility and so on. In some cases, the statuses of these operating facilities and the components are remotely monitored and controlled. For example, in a factory and an experiment/research facility, appliances or devices, switches, and lamps are operated as components according to the purposes, the operations of appliances or devices and switches are remotely controlled, and the statuses of components such as a lamp, manufactured products, materials used for production, or subjects in experiments are remotely monitored. In a medical facility, for example, the vital signs of patients are remotely monitored in a nurses' station and medical equipment is remotely controlled based on the monitoring result. The remote monitoring and remote control are performed using monitoring images displayed on the monitor of the controller of a PC and so on. In such a monitoring image, the statuses of components such as appliances or devices and switches in an operating facility are displayed as display components of as an illustration, a photograph, a moving image, and so on. For example, the temperatures, quantities, and weights of the components and materials are to be monitored and thus are displayed as display components such as numeric values or on a meter. Moreover, the display components of appliances or devices and switches are configured such that components such as appliances or devices and switches in the operating device are operated in response to operations on the display components of a monitoring image on a control screen. For example, the switches can be turned on or off or the operations of the devices can be changed in the operating facility in response to operations on the display components on the control screen. In this way, the display components allow an operator to intuitively recognize the status of the operating facility, thereby increasing the operability of the operating facility. The display components include moving images for simulating a motion of an object at a production location and lines or images that can be moved, rotated, and scaled up or down according to linked data.

In the creation of the monitoring image, for example, a device for creating a monitoring image according to the present invention can perform an editing function and an operation checking function. In an editing state, the device for creating a monitoring image sets the position of a display component on an operation screen and links the display component to the corresponding component. Furthermore, in the editing state, the device for creating a monitoring image can create a script for controlling the operation of the display component or a script for operating the component if the operation of the display component is controlled or the component is operated by the display component. The display component is associated with the link information and the script so as to create display data for each of the display components. In the editing state, the device for creating a monitoring image can execute display data for each display component or the display components of the overall monitoring image. The display component is changed according to the status of the linked component or the numeric value of the linked component is displayed on the display component. Moreover, in the editing state, the function of compiling an edited script is provided, thereby converting the script into an executable form prior to the execution of the display data. The edited script can be immediately executed. Furthermore, the display component includes an edition region and an operation check region. On the operation screen, the edition region and the operation check region of the display component overlap each other. The status of the display component can be easily switched between the editing state and an operation checking state on the operation screen.

In the creation of the monitoring image, the display component is placed in the editing state and is disposed at the corresponding position in the monitoring image on the operation screen. Moreover, a link is formed between the display component and the corresponding component of the operating device, and the script is optionally created for the display component, thereby creating the display data. These operations are repeated for the display components disposed in the monitoring image. At this point, an operation check can be performed on the display data every time one segment of the display data is created or after multiple segments of the display data are created. The editing state and the operation checking state can be switched by changing programs to be executed. Alternatively, the states can be switched by selecting the edition region or the operation check region on the display component. Also when the programs to be executed are changed, the operation screen is not apparently changed. An operation can be checked by, for example, clicking the display component. Switching is performed by a switch provided on, for example, the operation screen. If switching is performed by selecting the edition region or the operation check region, the display component can be edited by selecting the edition region with a click or the like and an operation can be checked by, for example, a click on the operation check region.

As has been discussed, the device for creating a monitoring image can perform the editing function and the operation checking function and the display component has the edition region and the operation check region. Thus, an operation can be checked using the operation check region while a monitoring image is created using the edition region, thereby efficiently creating the monitoring image without switching devices.

In this example, the component of the operating facility is displayed as a display component. External facilities to be linked to display components include external data such as data stored on the web and data stored in a device other than the operating facility, in addition to the components of the operating facility. If the display component and external data are linked, the external data of the display component can be displayed as a number or can be processed to display a converted value, a graph, a table, and so on. The external data can be converted using a created script.

As an embodiment of a device and method for creating a monitoring image according to the present invention, an example of a factory that is a facility operating as an external facility will be described below in accordance with the accompanying drawings.

Figure 2:
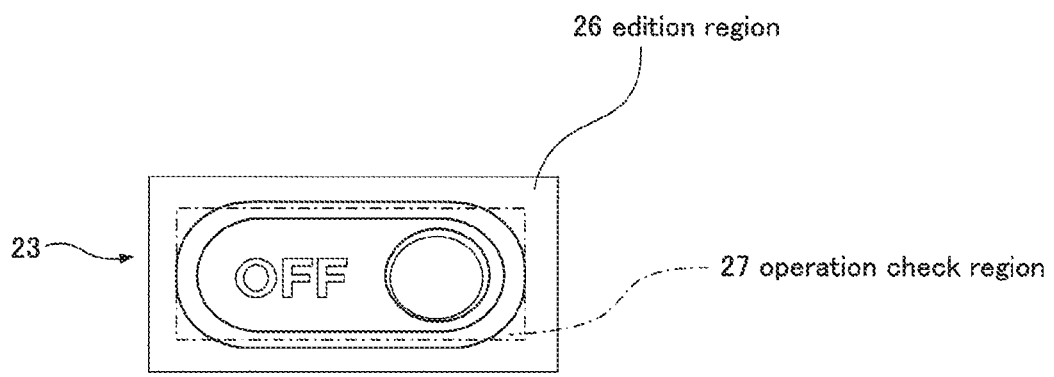
FIG. 2 is an explanatory drawing showing the configuration of a display component.
Figure 3:
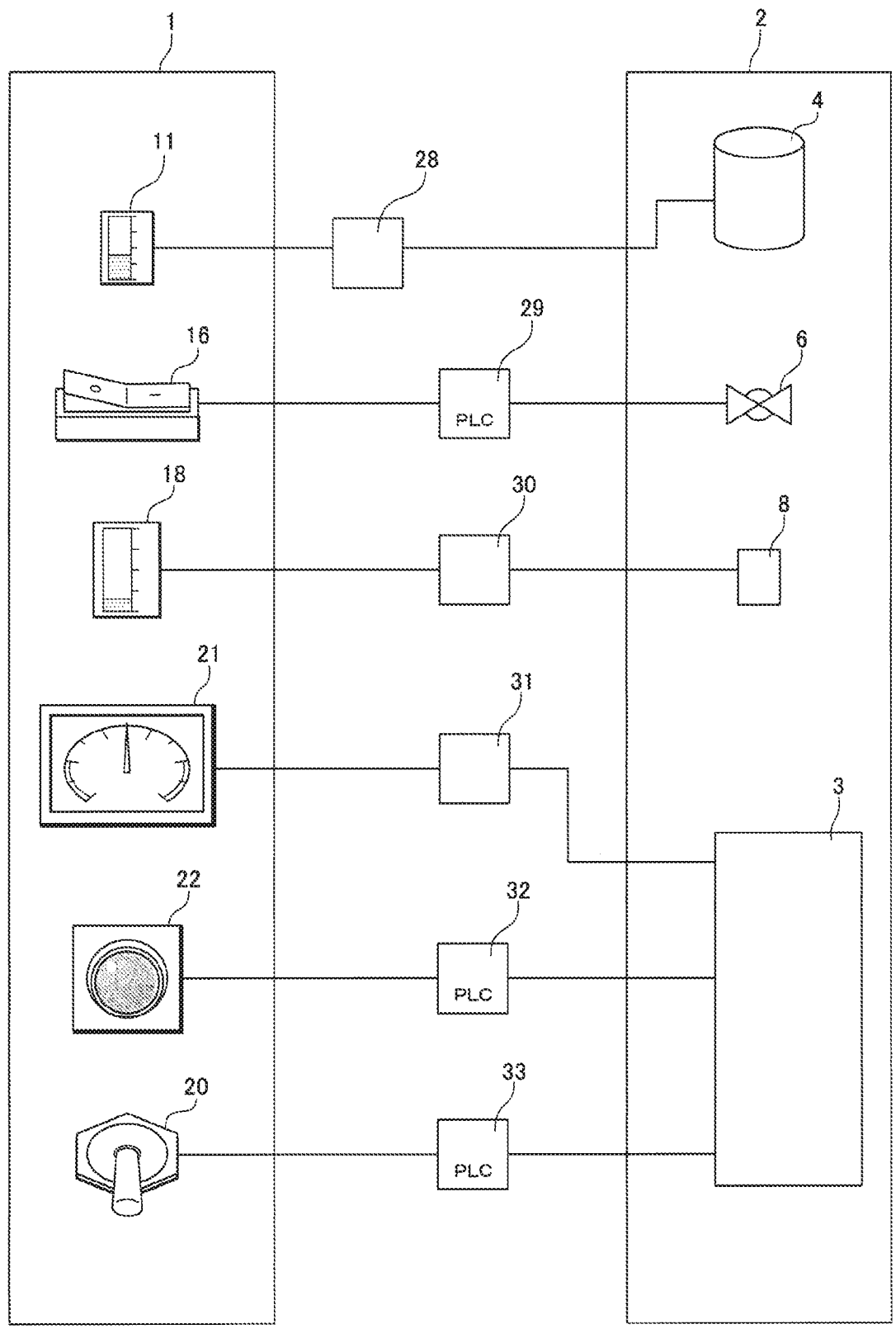
FIG. 3 is an explanatory drawing showing the correlation between the components of the operating facility and the display components of the monitoring image.
Figure 4:
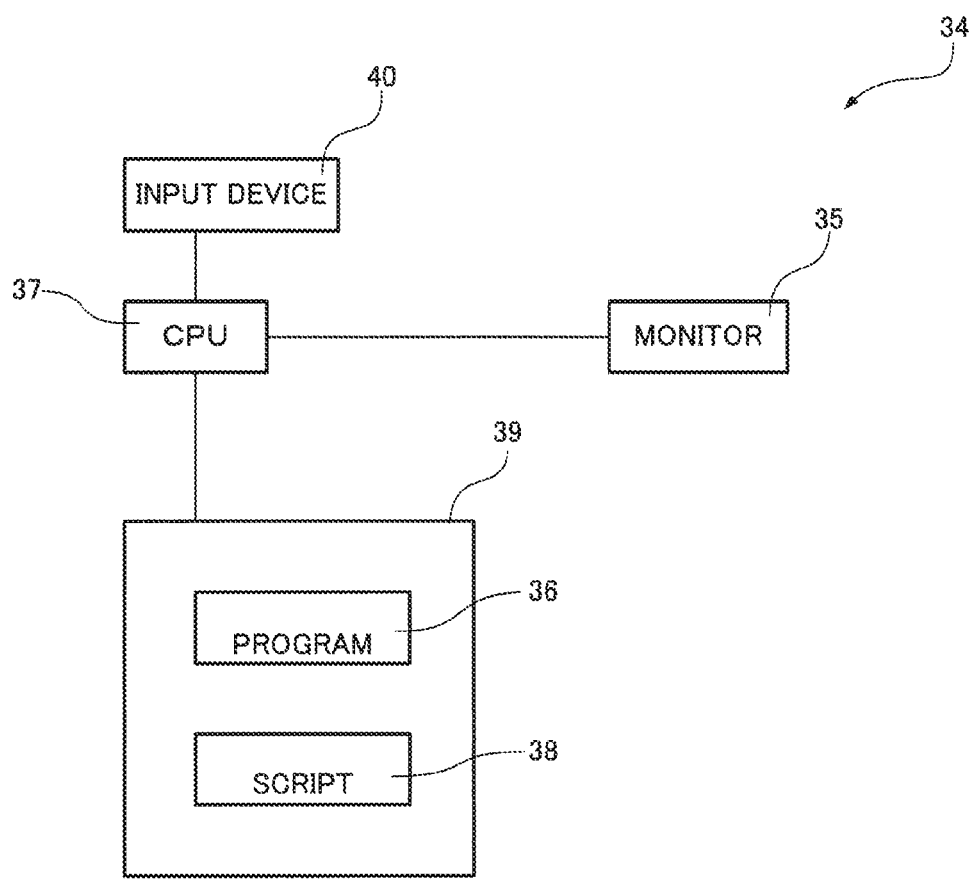
FIG. 4 is a schematic diagram showing the configuration of the device for creating the monitoring image.
Figure 5:
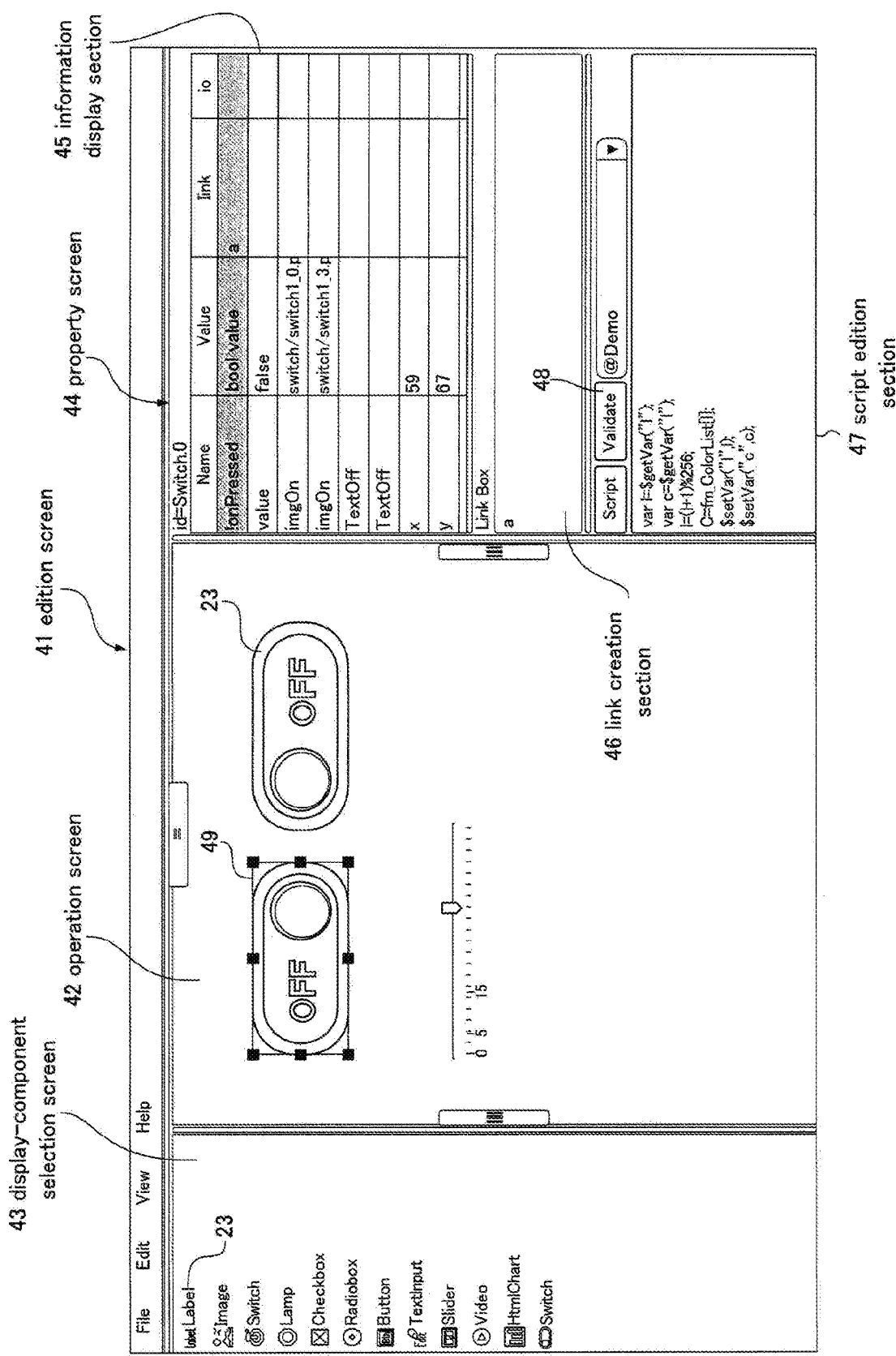
FIG. 5 illustrates the configuration of the edition screen of the device for creating the monitoring image.
Figure 6:
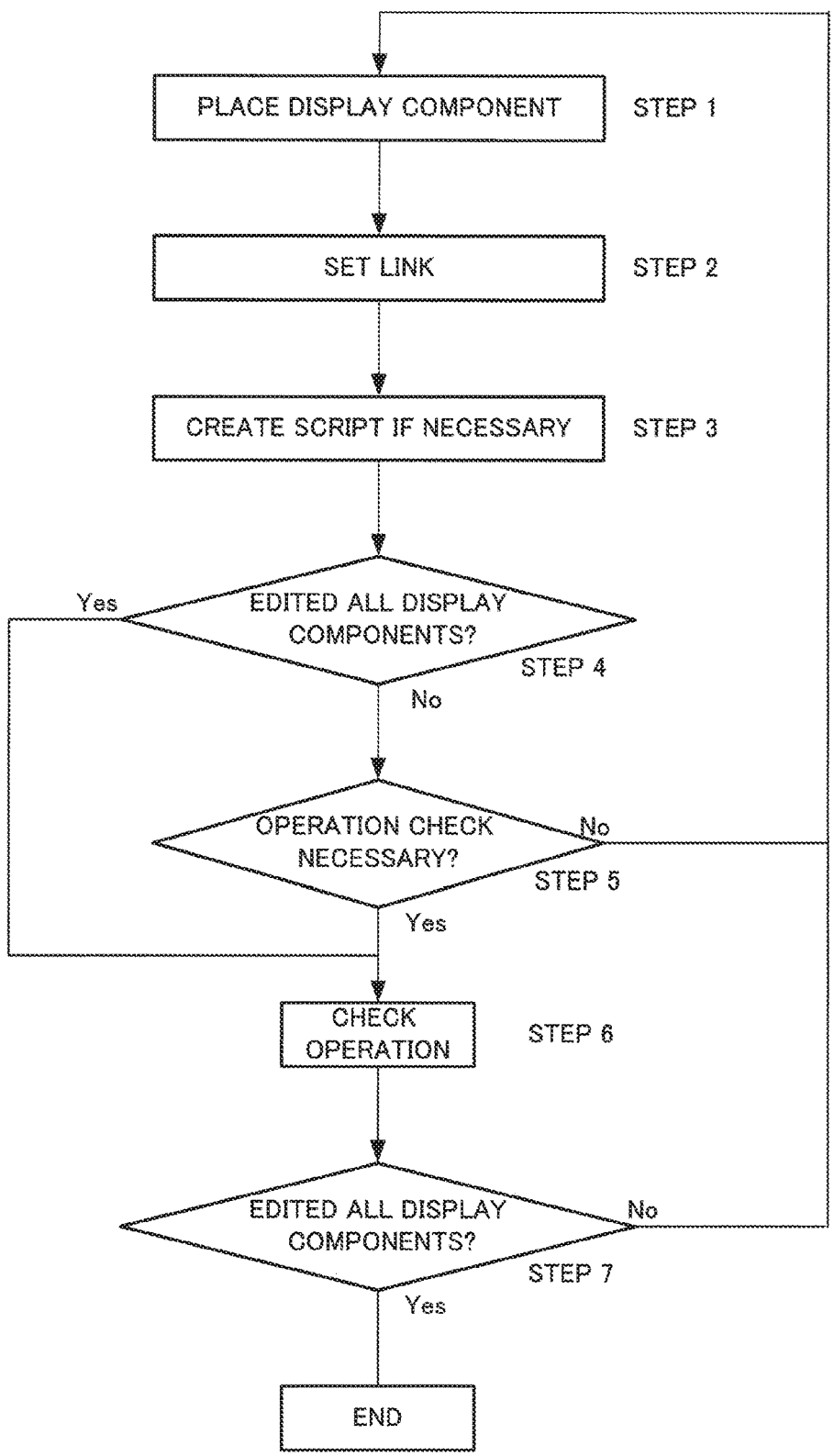
FIG. 6 is a flowchart showing a method for creating the monitoring image.

FIG. 1 illustrates the configuration of an operating facility and a monitoring image. FIG. 2 is an explanatory drawing showing the configuration of a display component. FIG. 3 is an explanatory drawing showing the correlation between the components of the operating facility and the display components of the monitoring image. FIG. 4 is a schematic diagram showing the configuration of the device for creating the monitoring image. FIG. 5 illustrates the configuration of the edition screen of the device for creating the monitoring image. FIG. 6 is a flowchart showing a method for creating the monitoring image.

Referring to FIG. 1, the relationship between the components of a factory and the display components of the monitoring image will be first described below.

As shown in FIG. 1, a factory 2, an example of an operating facility, includes a production unit 3. The production unit 3 receives a required amount of raw materials from tanks 4 and 5 and produces products. The supply of the raw materials is adjusted by valves 6 and 7 installed between the tanks 4 and 5 and the production unit 3. The tanks 4 and 5 can monitor the amounts of stored raw materials. The amounts of raw materials supplied to the production unit 3 from the tanks 4 and 5 are measured by sensors 8 and 9, respectively. The production unit 3 has a switch 10 for outputting the produced products. Moreover, the internal temperature of the production unit 3 can be measured. The production unit 3, the tanks 4 and 5, the valves 6 and 7, the sensors 8 and 9, and the switch 10 are used as components.

For example, a monitoring image 1 is an image for controlling the factory 2. The monitoring image 1 is displayed on the monitor of a controller 50 of, for example, a PC including an arithmetic unit of a CPU. The monitoring image 1 may be displayed by a web browser or a special program running on the controller 50. The factory 2 and the controller 50 of the PC that displays the monitoring image 1 are connected to each other via a radio or wired line 24 such as an LAN. Data is transmitted and received through a device 25. Reference numeral 13 denotes a display component corresponding to the production unit 3 that is a component of the factory 2. Likewise, the tanks 4 and 5 are equivalent to display components 14 and 15, the valves 6 and 7 are equivalent to display components 16 and 17, the sensors 8 and 9 are equivalent to display components 18 and 19, and the switch 10 is equivalent to a display component 20. Moreover, the monitoring image 1 includes, as display components 11 and 12, meters indicating the amounts of raw materials remaining in the tanks 4 and 5. Furthermore, the monitoring image 1 includes, as a display component 21, a meter that indicates the temperature of the production unit 3, and includes, as a display component 22, a lamp that is illuminated when the temperature of the production unit 3 is equal to or higher than a predetermined temperature. The factory 2 may be actually provided with a component that issues an alarm about a temperature increase and corresponds to the lamp. The display components 11, 12, 18, 19, and 21 acting as meters are displayed so as to indicate values measured in the factory. The display components 16, 17, and 18 acting as operation switches are operated by a screen touch or a mouse-click on the monitoring image 1. This can actually operate the factory 2. For example, the valves 6 and 7 of the factory 2 are opened or closed, or the output of products is started or stopped by the switch 10.

Referring to FIG. 1 to 3, the correlation between the components of the factory 2 and the display components of the monitoring image 1 will be described below.

The display components of the monitoring image 1 and the equivalent components of the factory 2 are associated with each other by forming links. The link is established by connecting the display component and the component via the line 24 and the device 25 so as to transmit and receive data. Furthermore, the display components optionally have scripts. The scripts include a script for operating the display component according to data transmitted from the component of the factory 2 and a script that is executed by an operation of the display component so as to operate the component of the factory. The scripts are optionally associated with the display components. As shown in FIG. 2, each display component 23 includes an edition region 26 selected during the creation of a monitoring image and an operation check region 27 used for an operation check of the created display component 23. The edition region 26 includes image data for the display component 23 and position information. The operation check region 27 is associated with corresponding link information and the script, constituting display data. The device 25 is, for example, an I/O device or a PLC. An I/O device only transmits and receives data between the components of the factory 2 and the display components of the monitoring image 1. A PLC converts data received from the components of the factory 2 or the display components of the monitoring image 1 and then transmits the data to the display components of the monitoring image 1 or the components of the factory 2. In the case of a link to external data, the link may be established through a web server or a communication line.

For example, as shown in FIG. 3, the display component 11 of the monitoring image is a meter that indicates the amount of raw materials remaining in the tank 4 of the factory 2. The display component 11 receives, as data, the amount of raw materials measured in the tank 4. The script is executed according to the received data and displays the display component 11 in a state corresponding to the amount of remaining raw materials. For example, if the amount of the remaining raw materials is 25 kg, the display component 11 is displayed such that the meter indicates 25 kg. An I/O device 28 is used as a data transfer device because data conversion is not necessary. Similarly, data measured by the sensor 8 is transmitted to the display component 18, which serves as a meter, through an I/O device 30. The display component 18 provides display according to the transmitted data. The display component 21 serving as a meter also receives an internal temperature of the production unit 3 as data through an I/O device 31 and is displayed in a state corresponding to the data. The display component 16, which serves as a switch for monitoring and controlling the opening and closing of the valve 6, transmits and receives data to and from the valve 6 through a PLC 29 used as a device. Data indicating an opened or closed state of the valve 6 is transmitted to the display component 16, and then the display state of the display component 16 is changed to ON or OFF according to the data. When the ON or OFF of the display component 16 in the monitoring image 1 is changed, data indicating the state is transmitted to the PLC 29. The PLC 29 converts the received data to data for opening or closing the valve 6 and then transmits the converted data to the valve 6. This opens or closes the valve 6. Likewise, the PLC 32 receives an internal temperature of the production unit 3 as data, decides whether or not the internal temperature has reached at least a predetermined temperature, and then transmits data on the display state of the display component 22 to the display component 22 according to the decision result. The display component 22 receives the data from the PLC 32 and changes the display state according to the data. For example, if the internal temperature is equal to or higher than the predetermined temperature, a red lamp is displayed, whereas if the internal temperature is not higher than the predetermined temperature, a green lamp is displayed. A PLC 33 receives data on the state of the switch 10 of the production unit 3, converts the data to a signal for controlling the state of the display component 20, and transmits the signal to the display component 20. Moreover, the PLC 33 receives data on a change of the state of the display component 20, converts the data to data for operating the switch 10, and transmits the data to the switch 10. The display component 20 having received the data displays a state according to the data. The switch 10 having received the data is turned on or off according to the data, thereby controlling the output of the product. A moving image, which is not shown, can be also displayed as a display component. For example, a display component for displaying a moving image of the interior of the factory 2 can be provided in the monitoring image 1. The inside of the factory 2 can be remotely monitored through the moving image.

Referring to FIGS. 1 to 5, the device for creating a monitoring image will be described below.

A monitoring-image creating device 34 is a controller that operates on a computer, e.g., a PC. The monitoring-image creating device 34 includes a monitor 35 that displays the operation screen, a program 36 that operates the monitoring-image creating device 34, an arithmetic unit, e.g., a CPU 37 that controls the monitoring-image creating device 34 and reads and executes the program 36, a script 38 associated with display data, a storage device 39, e.g., RAM or ROM that stores at least the program 36 and the script 38 so as to be readable by the CPU 37, and an input device 40, e.g., a mouse or a keyboard. The display component 23 includes image data. Link information and the script 38 are combined to constitute display data that is stored in, for example, the storage device 39.

When a monitoring image is created, an edition screen 41 is displayed on the monitor 35. The edition screen 41 includes, for example, an operation screen 42, a display-component selection screen 43, and a property screen 44. The operation screen 42 is a screen for placing the display component 23 so as to form the outline of the monitoring image 1. The display-component selection screen 43 is a screen including the multiple display components 23 and allows the selection of the display component 23 to be placed in the monitoring image 1. The display component 23 to be stored in the storage device 39 may be created beforehand or may be additionally created by a user. The property screen 44 includes an information display section 45, a link creation section 46, and a script edition section 47. The information display section 45 displays information such as terminal information and layout information on the display component 23 being operated on the operation screen 42. The link creation section 46 sets the link of the display component 23. The link is set by indicating the ID or terminal of the device 25 to be connected to the display component 23. At least one I/O device and PLC may be used as the device 25. The information on the ID and terminal of the device 25 is set beforehand. The script edition section 47 is a screen where the script 38 for operating the display component 23 is edited as necessary. The script 38 can be created in various languages. Moreover, a validate button 48 is provided. By selecting the validate button 48, the edited script 38 can be compiled and stored in an executable state. The edition screen 41 may be displayed by starting a web browser. In addition to the function of editing the monitoring image 1, the program 36 for operating the edition screen 41 has the function of transmitting and receiving data to and from the device 25 or performing a simulation with a recognized link, and the program 36 is capable of performing an operation checking function for executing the script 38. The display component 23 can be always made executable and thus is operated in response to an operation of the operation check region 27. The operation result is transmitted to the device 25 by setting the link. Moreover, data received or inputted from the device 25 is reflected to the display component 23. The operation and movement of the display component 23 can be always checked during an editing operation. A correction of the link by the link creation section 46 and a correction of the script 38 are quickly reflected to a movement of the display component 23.

The display data of the display component 23 also includes the edition region 26 and the operation check region 27. The monitoring image 1 is edited using the edition region 26. In an operation check, the operation check region 27 is operated to check an operation after a link is established and the script 38 is read. During an editing operation, the display component 23 being edited displays an edition frame 49 in response to selection of the edition region 26 by a click. A drag-and-drop operation on the edition frame 49 can edit the position of the display component 23. Furthermore, the outside shape of the edition frame 49 is scaled up or down so as to change the display size of the display component 23. The edition region 26 is provided over a wider range than the operation check region 27, so that the edition region 26 and the operation check region 27 can be selected by changing a point to click the display component 23. In an operation check, a change of the display state of the display component 23 is checked by, for example, clicking the operation check region 27, enabling the operation check.

Referring to FIGS. 1 to 6, a method of creating a monitoring image using the monitoring-image creating device will be described below.

First, the edition screen 41 is opened on the monitoring-image creating device 34. The display component 23 to be displayed in the monitoring image 1 is selected from the display-component selection screen 43 and is placed in the operation screen 42. The display component 23 is selected and placed by, for example, a drag-and-drop operation on the display component 23. The position and size of the display component 23 are changed by selecting the edition region 26 of the display component 23 and then operating the edition frame 49 (step 1 in FIG. 6).

Subsequently, a link is set between the display component 23 being edited and the component of the factory 2. While the display component 23 is selected, the link is set by writing, in the link creation section 46, the ID and the terminal number of the device 25 supposed to transmit and receive data. A symbol corresponding to the ID and the terminal number may be registered beforehand. For example, a symbol "a" may be written. The device 25 can be selected from an I/O device and a PLC according to the necessity for data conversion. The device 25 is connected beforehand to the corresponding component of the factory 2. The selected device 25 transmits and receives data to and from the display component 23 (step 2 in FIG. 6).

After that, the script 38 is created on the script edition section 47 if necessary. The creation of the script 38 operates the display component 23 on the monitoring image 1 according to received data and remotely controls the component of the factory 2 according to data transmitted from the display component 23. The script 38 can be compiled by the validate button 48. The script 38 is executed in the absence of an error (step 3 in FIG. 6). At this point, the creation of display data for one of the display components 23 is completed. While the monitoring image 1 is created, the multiple display components 23 can be placed on the screen. Various kinds of display components 23 are available. For example, the display components 23 include a picture for displaying an object on site, a moving image for simulating a motion of an object, and a line and an image that can be moved, rotated, or scaled up or down by setting a link.

Subsequently, in this state, it is decided whether all the display components 23 have been edited or not (step 4 in FIG. 6). If the display components 23 have not been edited, it is decided whether to check an operation at this point (step 5 in FIG. 6). If an operation check is not necessary, the operations of steps 1 to 4 are repeated and display data is continuously created for other display components 23 until all the display components 23 are edited.

If all the display components 23 have been edited or an operation check needs to be performed, the operation check edition region 27 is selected in all the display components 23 or the display component 23 requiring an operation check, and then the display component 23 is clicked to check an operation. Since the monitoring-image creating device 34 can recognize a link and execute the script 38, an operation can be checked on the monitoring-image creating device 34. An operation check is performed by actually transmitting or receiving data to or from the factory 2 or transmitting data to the display component 23 through a simulation. For example, in the case of a switch, an operation check can be also performed by checking a change of the ON/OFF state of the display component 23 with a click on the switch on the edition screen 41. If the operation is found to be faulty, the processing in steps 1 to 3 is examined and corrected (step 6 in FIG. 6).

If no faulty is found in the operation check, it is confirmed whether all the display components 23 have been edited or not (step 7 in FIG. 6). If all the display components 23 have not been edited, the process returns to step 1 to edit other display components 23. If all the display components 23 have been edited, the editing operation is ended.

In this way, the monitoring-image creating device 34 can perform the editing function and the operation checking function, and the display component 23 has the edition region 26 and the operation check region 27. Thus, an operation can be checked using the operation check region 27 while a monitoring image is created using the edition region 26. This allows the monitoring image 1 to be efficiently created without switching devices.

Moreover, the program 36 may place the display component 23 being displayed and set a link with an external component before an operation check on the display component 23. The program 36 displays the display component 23 including the edition region 26 and the operation check region 27 on the edition screen 41. While the edition region 26 is selected, the program 36 displays and places the display component 23 in response to an operation of an operator, and sets a link with an external facility according to link information inputted by the operator. While the operation check region 27 is selected, the program 36 checks an operation of the selected and executed display component 23. Furthermore, the program 36 is divided into a program for editing the monitoring image 1 and a program for an operation check on the display component 23. The monitoring-image creating device 34 may switch the programs between an editing operation and an operation check such that the editing program is executed during an editing operation and the operation check program is executed during an operation check. Also in this case, it is not necessary to switch the monitoring-image creating device and a device for an operation check, thereby efficiently creating the monitoring image 1.

In the above explanation, a factory was described as an example. As has been discussed, the operating device is not limited to a factory. The present invention is applicable to any facility as long as remote monitoring and remote control can be performed.

Having described the invention, the following is claimed:

1. A device for creating a monitoring image, comprising:

a monitor that displays an edition screen for editing the monitoring image; and an arithmetic unit that controls the edition screen, wherein the edition screen includes a display-component selection screen, an operation screen, a property screen and an individually selectable edition region assigned to each of one or more display-components when the one or more display-components are selected from the display-component screen, the display-component selection screen includes a particular display component from the one or more display-components constituting the monitoring image, the particular display component is selected and the monitoring image is placed in the operation screen, link information making association between the particular display component on the edition screen and an external facility is written in the property screen, the arithmetic unit sets a link so as to transmit and receive data between the particular display component and the external facility according to the link information and optionally creates a script for operating the display component or a script executed by an operation of the particular display component so as to operate the external facility according to data transmitted from the external facility, data received or inputted from the external facility is reflected to the display component on the operation screen according to the link information, the particular display component on the edition screen includes display of its assigned edition region as an edition frame, that functions to at least change the position and size of the particular display component when the edition region is selected and an operation check region, the edition region is bounded within an area of the particular display component and the operation check region is within the edition region, and the edition region is selected on the operation screen so as to edit the monitoring image, whereas the operation check region is selected and executed on the operation screen so that an operation of the particular display component can be checked by actually transmitting or receiving data to or from the external facility and so that the operation result of the particular display component is transmitted to the external facility according to the link information.

2. The device for creating a monitoring image according to claim 1, wherein the external facility includes one or both of a component of the external facility and external data.

3. The device for creating a monitoring image according to claim 1, further comprising a storage device that stores a program for controlling an editing operation on the monitoring image and an operation check on the display component, wherein the arithmetic unit executes the program.

4. A device for creating a monitoring image, comprising:

a monitor that displays an edition screen for editing the monitoring image; and an arithmetic unit that controls the edition screen, wherein the edition screen includes a display-component selection screen, an operation screen, a property screen and an individually selectable edition region assigned to each of one or more display-components when the one or more display-components are selected from the display-component screen, the display-component selection screen includes a particular display component from the one or more display-components constituting the monitoring image, the particular display component is selected and the monitoring image is placed in the operation screen, link information making association between the particular display component on the edition screen and an external facility is written in the property screen, the arithmetic unit sets a link so as to transmit and receive data between the particular display component and the external facility according to the link information and optionally creates a script for operating the display component or a script executed by an operation of the particular display component so as to operate the external facility according to data transmitted from the external facility, data received or inputted from the external facility is reflected to the display component on the operation screen according to the link information, the particular display component on the edition screen includes display of its assigned edition region as an edition frame that functions to change the position and size of the particular display component when the edition region is selected and an operation check region, the edition region is bounded within an area of the display component and the operation check region is within the edition region, and an edition mode and an operation check mode are switchable on the same edition screen such that selection of the edition mode enables to edit the monitoring image using the edition region and selection of the operation check mode enables to execute the operation check region so that an operation of the particular display component on the operation screen can be checked by actually transmitting or receiving data to or from the external facility and so that the operation result of the particular display component is transmitted to the external facility according to the link information.

5. A method for creating a monitoring image for each display component of one or more display-components and each particular display component from the one or more display-components includes its own individually assigned edition region that functions to at least change the position and size of the particular display component when the edition region is selected, the edition region is bounded within an area defined of the particular display component and the operation check region is within the edition region, wherein a device for creating the monitoring image is configured such that selection of the edition region edits the monitoring image, whereas selection and execution of the operation check region enables an operation check on the particular display component on the device for creating the monitoring image, the method comprising:

selecting the assigned edition region of a target display component from one of the particular display components to perform the editing of the monitoring image and placing using at least the position changing function of the selected assigned edition region, the target display component within an operation screen;

setting a link so as to transmit and receive data between the target display component and an external facility while the assigned edition region is selected;

reflecting data received or inputted from the external facility to the target display component in the operation screen according to the setting of the link; and selecting the operation check region of the target display component to perform the operation check of the target display component by actually transmitting or receiving data to or from the external facility and so as to transmit the operation result of the target display component to the external facility according to the setting of the link.

6. The method for creating a monitoring image according to claim 5, further comprising, before or after setting the link, creating a script for operating the target display component when the edition region is selected.

7. A non-transitory computer-readable medium comprising computer executable instructions for creating a monitoring image for each display component of one or more display-components by using a monitor for displaying an edition screen which includes a display-component selection screen, an operation screen, a property screen and an individually selectable edition region assigned to each of one or more display-components, and a computer, the computer executable instructions, when executed by the computer, causes the computer to:

display the assigned edition region of a particular display component from the one or more display-components as an edition frame that functions to change the position and size of the particular display component when the assigned edition region is selected and an operation check region of the particular display component as a display component on the edition screen, the assigned edition region of the particular display component is bounded within an area of the particular display component and the operation check region is within the edition region, place the particular display component into the operation screen by selecting the assigned edition region of the particular display component, set a link so as to transmit and receive data between the particular display component on the edition screen and an external facility when the assigned edition region of the particular display component is selected, and reflect data received or inputted from the external facility to the particular display component in the operation screen according to the setting of the link, and select the operation check region of the particular display component to check an operation of the particular display component by actually transmitting or receiving data to or from the external facility and so as to transmit the operation result of the particular display component to the external facility according to the setting of the link.

8. A non-transitory computer-readable medium comprising computer executable instructions for creating a monitoring image for each display component of one or more display-components by using a monitor for displaying an edition screen which includes a display-component selection screen, an operation screen, a property screen and an individually selectable edition region assigned to each of one or more display-components, and a computer, the computer executable instructions, when executed by the computer, causes the computer to:

switch an edition mode and an operation check mode on the same edition screen in response to an input from outside, display the assigned edition region of a particular display component from the one or more display-components as an edition frame that functions to change the position and size of the particular display component when the assigned edition region is selected on the edition screen in the edition mode and display an operation check region of the particular display component on the edition screen in the operation check mode, the assigned edition region is bounded within an area of the respective display component and the operation check region is within the edition region, place the particular display component into the operation screen while displaying the edition region of the display component by selecting the assigned edition region of the particular display component, set a link so as to transmit and receive data between the particular display component on the edition screen and an external facility while displaying the edition frame of the display component when the assigned edition region of the particular display component is selected, reflect data received or inputted from the external facility to the particular display component in the operation screen according to the setting of the link, and check an operation of the particular display component by actually transmitting or receiving data to or from the external facility and transmit the operation result of the display component to the external facility according to the setting of the link while displaying the operation check region of the display component when the operation check region of the particular display component is selected.

* * * * *